United States Patent [19]

Gardner et al.

[11] Patent Number: 5,157,080

[45] Date of Patent: Oct. 20, 1992

[54] COATING COMPOSITION

[75] Inventors: Kenneth J. Gardner, Springfield, Mass.; Gary T. X. Mallalieu, Meriden, Conn.

[73] Assignee: Monsanto Company, St. Louis, Mo.

[21] Appl. No.: 677,507

[22] Filed: Apr. 3, 1991

Related U.S. Application Data

[63] Continuation-in-part of Ser. No. 523,731, May 15, 1990, abandoned.

[51] Int. Cl.$^5$ ............ C08L 61/06; C08L 61/10; C08L 29/06; C08L 29/08
[52] U.S. Cl. ............ 525/134; 525/154; 525/155; 525/502
[58] Field of Search ............ 525/502, 154, 155, 134

[56] References Cited

U.S. PATENT DOCUMENTS

| | | | |
|---|---|---|---|
| 3,030,332 | 4/1962 | Lombardi et al. | 260/43 |
| 3,133,838 | 5/1964 | Higgins | 148/6.15 |
| 4,157,324 | 6/1979 | Culbertson | 260/32.8 R |
| 4,554,319 | 11/1985 | Heaps et al. | 525/155 |
| 4,593,052 | 6/1986 | Irving | 522/31 |
| 4,808,652 | 2/1989 | Gardner | 524/376 |
| 4,909,915 | 3/1990 | Bederke et al. | 204/181.4 |

FOREIGN PATENT DOCUMENTS 666392 7/1963 Canada.

*Primary Examiner*—James J. Seidleck
*Assistant Examiner*—W. R. H. Clark
*Attorney, Agent, or Firm*—R. Bruce Blance; William J. Farrington

[57] ABSTRACT

A crosslinker composition comprising an etherified phenol-formaldehyde resin modified by addition of a styrene (meth)-allyl alcohol copolymer is used to provide epoxy and polyester-alkoxymethylmelamine coil coating compositions of enhanced gloss, hardness, chemical resistance, adhesion and flexibility.

6 Claims, No Drawings

COATING COMPOSITION

This application is a continuation-in-part of Ser. No. 07/523,731, filed May 15, 1990 now abandoned.

TECHNICAL FIELD

This invention pertains to coating compositions and more particularly to coating compositions for coating metallic substrates.

BACKGROUND OF THE INVENTION

Coating compositions based on epoxy resins and allyl ethers of methylolphenols have been described as useful in the manufacture of coated metal sheets and coils used in container, can and appliance manufacture. Such compositions are difficult to cure adequately in the short cure cycles of current manufacturing processes.

High ortho etherified resole resins characterized by having a relatively low degree of polymerization, capable of rapid cure at elevated temperatures yet having storage stability at temperatures of 20° to 25√ C. have been suggested for use with a great variety of co-reactive resins containing co-reactive groups selected from hydroxy, carboxy, acetal, amide, keto, methylol, isocyanate and alkoxymethyl.

When such high ortho etherified resol resins are formulated with hydroxy functional resins such as hydroxy functional acrylic resins or styrene allyl alcohol copolymers, they yield coatings which are deficient in flexibility and resistance to reverse impact. When they are formulated with epoxy resins, they yield coating which are deficient in flexibility and resistance to chemical attack.

SUMMARY OF THE INVENTION

The present invention is directed to a modified crosslinker composition used with coating vehicles to provide cured coatings on metal substrates such as sheets and coils, exhibiting improved hardness, chemical resistance, flexibility, gloss, adhesion and resistance to yellowing. The modified crosslinker composition comprises from 9 to 99 parts by weight of an etherified phenolio resin and from 1 to 83 parts by weight of a styrene allyl alcohol copolymer. The styrene allyl alcohol copolymer modifies the crosslinking effect of the etherified phenolic resin by reaction with it and is incorporated into coating compositions cured with the etherified phenolic resin to provide the enhanced properties. One embodiment of the coating composition comprises from about 30 parts by weight to about 75 parts by weight of an epoxy resin, from about 4 parts by weight to about 30 parts by weight of a styrene allyl alcohol copolymer and from about 21 parts by weight to about 40 parts by weight of an etherified phenolic resin. In another embodiment, the coating composition includes from about 60 to about 90 parts by weight of a curable polyester/alkoxymethyl melamine system, from about 2 to about 10 parts by weight of a styrene allyl alcohol copolymer and from about 0.5 to about 15 parts by weight of an etherified phenolic resin.

DETAILED DESCRIPTION OF THE INVENTION:

The crosslinker composition of the present invention comprises from about 9 to about 99 parts by weight and of an etherified phenolic resin and from about 1 to about 83 parts by weight of a styrene allyl alcohol copolymer. Preferably where the crosslinker composition is the only crosslinker intended to be formulated into a coating composition, the etherified phenolic resin is present in the range of about 55 to about 85 parts by weight and the styrene allyl alcohol is present in the range of about 15 to about 45 parts by weight.

Styrene allyl alcohol copolymers suitable for use in the crosslinker composition of the present invention include copolymers of styrene and allyl alcohol and copolymers of styrene and methallyl alcohol, exhibit an average molecular weight in the range of about 800 to about 2500 daltons and exhibit a hydroxy content between about 4.0 wt % and about 10 wt %. Preferably the hydroxy content of the copolymer is between about, 5.0 wt % and about 8.0 wt %.

Suitable etherified phenolic resins described in U.S. Pat. No. 4,157,324, the disclosure of which is incorporated herein by reference, are high ortho etherified resole resins. The phenol resole ethers described in U.S. Pat. 4,157,324 are resinous mixtures of monomeric, dimeric and higher condensation products of phenol and formaldehyde, modified by etherifrcation with monohydric alcohols and further modified by formation of dibenzyl ethers.

The monomer species are as shown below:

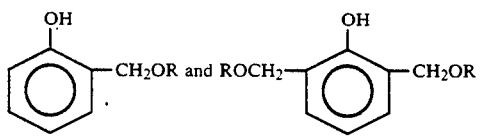

where R is alkyl, e.g. H, $CH_3$, $CH_2H_5$, $C_3H_7$, $C_4H_9$, etc.

The dimeric species are primarily as follows:

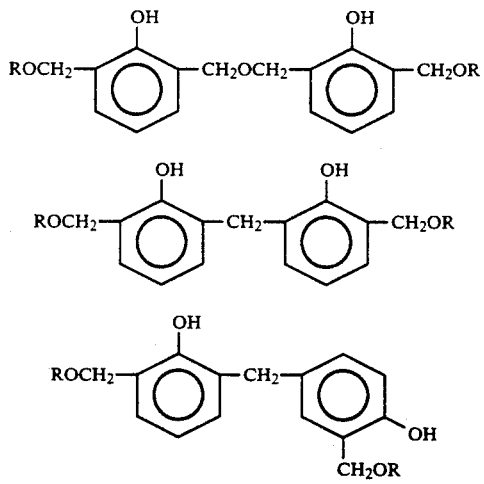

The higher condesation products may be represented as follows:

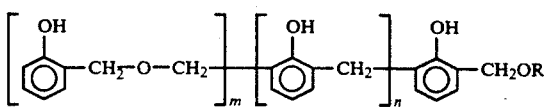

Complex mixtures of this type are best described in terms of number average structure as shown in "NMR of Phenolic Resins" of J. Poly Science 3:1079–1106 (1965) by Woodbrey, Higginbottom and Culbertson. In the case of the etherified resole being described here, the following terminology is used:

$R_A$—aromatic protons per phenolic ring
$R_{AM}$—methylol groups per phenolic ring
$R_{EB}$—benzylether bridges per phenolic ring
$R_{ME}$—alkoxymethyl or aralkoxymethyl ethers
$m+n+1$—average number of rings per molecule
$M_n$—number average molecular weight.

The high ortho etherified resole resin is characterized by:

A. having a reacted formaldehyde to phenol mol ratio of 1.10 to 2.0, said formaldehyde reacting with said phenol, forming methylol groups taking a final orientation of about 90% to 100% in the ortho position, B. having said phenol selected from the group consisting of phenol, meta-substituted phenols and mixtures of phenol and substituted phenols, C. having condensed phenol-aldehyde linkages wherein 25 to 90% of said linkages are benzyl ether linkages having a final orientation essentially in the ortho position and 10 to 75% are methylene linkages taking a final orientation of about 70 to 90% in the ortho position and about 10 to 30% in the para position, D. having an average degree polymerization in the range of about 1.45 to less than 4.0 and E. having said methylol groups partially etherified with monohydric alcohols.

Suitable etherified phenolic resins are self curable and contain both internal benzylic ether linkages and alkoxymethyl or aralkoxymethyl ether linkages.

In the preparation of the high ortho etherified resole resin, phenol is preferably used as the phenol without substituted phenols in admixture with it. Advantageously the resins may be prepared by first reacting phenol with formaldehyde in an aqueous reaction mixture under reflux at about 80° to 100° C. in the presence of a divalent electropositive metal ion while maintaining the PH of the reaction mixture in the range of about 4 to 7 controlled by adding sufficient amounts of an organic acid to form methylolphenols with about 90 to 100 percent of the methylol groups in the ortho position. The methylol phenol mixture is thereafter etherified with a monohydric alcohol and oligomerized at a temperature in the range of 65° -100° C. and the resulting aqueous solution is stripped of water and excess alcohol initially by distillation at atmospheric pressure and finally by vacuum distillation to an end temperature of about 80°-100° C. at a pressure of about 1–3kPa.

The monohydric alcohols used in etherifying the high ortho resole may be primary or secondary and include alkyl alcohols, cycloalkyl alcohols and aralkyl alcohols containing 1 to 12 carbon atoms per molecule such as methyl alcohol, ethyl alcohol, butyl alcohol, isobutyl alcohol, amyl alcohol, decyl alcohol, dodecyl alcohol, cyclohexanol, benzyl alcohol, and phenethyl alcohol. Up to 0.50 monohydric alcohol ether groups may be incorporated per phenolic ring. Preferably the amount incorporated is in the range of about 0.2 to about 0.4 per phenolic ring.

Epoxy resins suitable for use as a vehicle in one embodiment of the coating composition of the present invention are epoxy resins having a molecular weight in the range of about 140 to 3000 and containing two or more epoxy groups per molecule. Suitable epoxy resins include poly glycidyl compounds made by condensation reactions of bisphenol A and bisphenol F with epichlorohydrin, polyglycidyl derivatives of phenol formaldehyde novolaks, polyglycidyl derivatives of polyamines, polyglycidamides of triazine compounds and epoxy resins prepared by epoxidation of dienes and polyenes such as vinylcyclohexene, cyclohexadiene, dicyclopentenyl ether and dicyclohexenyl ether. Bisphenol A epichlorohydrin epoxy resins having an epoxy equivalent of 2300 daltons or less are preferred. It is preferred that the epoxy equivalent of the epoxy resin be about 700 daltons or less to provide high solids coating compositions.

In coating compositions based on an epoxy resin vehicle, it is preferred that the composition include from about 30 parts by weight to about 75 parts by weight of the epoxy vehicle, from about 4 parts by weight to about 30 parts by weight of the styrene allyl alcohol copolymer and from about 21 parts by weight to about 40 parts by weight of the etherified phenolic resin.

An acrylic resin can be included in the epoxy coating compositions of the present invention. The acrylic resin is any of a number of commercially available hydroxy functional acrylic resins of molecular weight in the range of about 300 to about 4000 daltons and containing an average number of hydroxyl groups per molecule in the range of about 2 to about 10. The acrylic resin is a polymer of at least one ester of an alpha-olefinic monocarboxylic acid having the general formula:

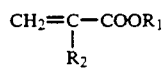

wherein $R_2$ is either hydrogen or a lower alkyl group of from 1 to 4 carbon atoms and R represents an alkyl, hydroxyalkyl or cycloalkyl group of from 1 to 18 carbon atoms, and may include one or more of the comonomers of the formula:

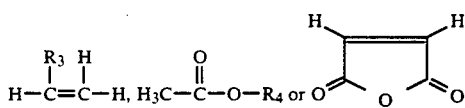

wherein $R_3$ is H, $CH_3$ or $C_6H_5$; and $R_4$ is alkene of 2 or 3 carbon atoms.

Examples of esters of alpha-olefinic monocarboxylic acids which may be used in the present invention include methyl acrylate, ethyl acrylate, propyl acrylate, isopropyl acrylate, butyl acrylate, hexyl acrylate, octyl acrylate, 2ethylhexyl acrylate, cyclohexyl acrylate, decyl acrylate, stearyl acrylate, methyl methacrylate, methyl alpha-ethyl acrylate, ethyl methacrylate, butyl methacrylate, butyl alpha-ethyl acrylate, and lauryl methacrylate. The hydroxy functionality is provided by hydroxy functional monomers such as hydroxyethyl acrylate, hydroxyethyl methacrylate and hydroxypropyl acrylate.

Examples of the comonomers which may be used in the acrylics of the present invention are glycidyl methacrylate, styrene, α-methyl styrene, acrylic acid, methacrylic acid, acrylonitrile, maleic anhydride, allyl acetate and vinyl acetate.

The modified crosslinker compositions of the present invention comprising etherifield phenolformaldehyde and styrene (meth)-allyl alcohol copolymers also be used with curable hydroxy functional polyester-alkoxymethylmelamine systems to enhance adhesion, flexibility, hardness, and humidity and salt spray resistance. Since crosslinking is provided primarily by the alkoxymethylmelamine resin, a much wider ratio of styrene allyl alcohol copolymer to etherified phenol-formaldehyde resin can be used. Suitable coating formulations are provided by compositions comprising form about 60 to about 90 parts by weight of the curable polyesteralkoxymethylmelamine system, from about 2 to about 10 parts by weight of styrene (meth)-allyl alcohol copolymer and from about 0.5 to about 15 parts by weight of etherified phenol-formaldehyde resin.

Polyesters which can be used as the vehicle in the polyester-alkoxymethyl-melamine systems may be saturated, unsaturated or oil-modified polyesters such as those polyesters well known in the surface coating art. They are of molecular weight less than about 10,000 daltons preferably in the range of about 300 to 4000 daltons, and their hydroxy functionality is in the range of about 2 to about 10. The polyesters are prepared by reacting a polyhydric alcohol (polyol) and a polybasic acid.

Such polyols include ethylene glycol, propylene glycol, butylene glycol, diethylene glycol, dipropylene glycol, triethylene glycol, neopentyl glycol, trimethylene glycol, polyethylene glycol, polypropylene glycol, 1,5-pentanediol, trimethylolethane, trimethylolpropane, glycerol, 1,2,6-hexanetriol, pentaerythritol, sorbitol, mannitol, methyl glycoside, 2,2bis(hydroxyethoxyphenyl) propane, 2,2-bis (betahydroxypropoxyphenyl) propane and the like. Monofunctional alcohols may also be employed to supplement the other polyols and to control the molecular weight. Useful alcohols include those having a hydrocarbon chain comprising from about 3 to about 18 carbon atoms.

The acid component of such polyesters may include unsaturated acids such as maleic acid, fumaric acid, itaconic acid, citraconic acid, glutaconic acid, mesaconic acid, and the like, and their corresponding anhydrides where such anhydrides exist. Other polycarboxylic acids which may be utilized in addition to the above-mentioned acids include saturated polycarboxylic acids such as succinic acid, glutaric acid, adipic acid, pimelic acid, suberic acid, azelaic acid, sebacic acid, and the like. Certain aromatic polycarboxylic acids and derivatives thereof may also be useful; for example phthalic acid, tetrahydrophthalic acid, hexahydrophthalic acid, terephthalic acid, endomethylenetetrahydrophthalic anhydride, tetrachlorophthalic anhydride, hexachloroendomethylene tetrahydrophthalic acid, and the like. The term acid as used in this specification includes the corresponding anhydrides, where such anhydrides exist.

In many instances it is optional to include a fatty acid. These include saturated fatty acids such as decanoic, dodecanoic, tetradecanoic, hexadecanoic, octadecenoic, docosanoic, and the like. And in addition, unsaturated fatty acids may be used such as 9-octadecenoic, 9, 12-octadecadienoic, 9,12,15-octadecatrienoic, 9,11,13octadecatrienoic, 4-keto-9,11,13-octadecatrienoic, 12-hydroxy-9-octadecenoic, 13-docosenoic, and the like.

As used in this description the term "alkoxymethylmelamine" refers to any of the large number of alkoxylated melamine-formaldehyde resins which are commonly employed in the art of surface coatings. Such melamine-formaldehyde resins are characterized as being soluble in common solvents as distinguished from melamine-formaldehyde of the thermosetting type which are employed in molding or casting compositions.

The alkoxymethylmelamines are substantially completely methylolated melamines substantially fully etherified with an alcohol. They can be prepared by reaction of melamine with formaldehyde to methylolate the amino groups and the products are then alkylated or etherified by reaction with alcohol. The etherified methylolated melamines are liquid and are essentially monomeric or at most are oligomeric with an average degree of polymerization of no more than about 3, the aminotriazine rings being joined by methylene or methylene ether bridges formed by condensation of two methylol groups. Thus, the etherified melamines within the scope of the invention possess a ratio of melamine to combined formaldehyde in the range of about 1:5.5 to about 1:6.0 and possess a ratio of melamine to alkyl ether groups in the range of about 1:5.0 to about 1:6.0. The alcohols suitable for etherification of the methylol melamine are branched or straight chain $C_1$ to $C_8$ alkyl alcohols. A mixture of alcohols such as methanol and butanol or methanol and isobutyl alcohol (2-methyl-1propanol) can be used for the etherification to make a mixed etherified aminoplast. Preferred mixed ethers are methoxy/butoxy and methoxy/isobutoxy ethers. The range of the ratio of methoxy/butoxy or methoxy/isobutoxy can vary widely. A preferred range is from about 2:1 to about 1:2. A single alkyl alcohol can also be used for etherification. For such an application, the preferred alcohol is methanol. Among the more preferred aminotriazine compounds is substantially monomeric hexamethoxymethyl melamine.

The solvent used for preparing crosslinker compositions and coating compositions can be any one or a mixture of solvents. Advantageously polar solvents such as alcohols, ketones, ethers, glycol ethers and acetates and mixtures of such solvents with aromatic hydrocarbons are used. Among the alcohols are those having from 1 to 5 carbon atoms per molecule including methyl, ethyl, propyl, butyl and amyl alcohols. In addition to alcohols, ketones, such as acetone, methyl ethyl ketone, methyl isobutyl ketone and methyl amyl ketone can be used. Examples of suitable acetates are ethyl, butyl and propyl acetate. Examples of suitable glycol ethers are methyl cellosolve, cellosolve and butyl cellosolve. A preferred solvent is n-butyl alcohol and mixtures thereof with other alcohols, ethers and ketones. Another preferred solvent is butyl cellosolve. Coating composition solutions of adequate viscosity for coating applications, advantageously have total solids from 30 to 80 wt %. The preferred range is 40 to 70%.

In order to enhance the rate of curing using the coating compositions, an acid catalyst can be used. Such catalysts include para-toluenesulfonic acid, dodecylbenzenesulfonic acid, methanesulfonic acid, dinonylnaphthalene disulfonic acid, butyl acid phosphate, hydrochloric acid, and other organic and mineral acids having at least one active hydrogen group per molecule. Preferred among these catalysts are the sulfonic acids. Catalyst concentration can range from about 0.25 to about 6% based on the total weight of the final coating depending upon the final end use. It should be noted that since most of the above acid catalysts are crystalline at room temperature, solutions at about 50% solids in methanol or another solvent having a boiling point of less than about 162° C. may be used to facilitate handling.

The coating compositions may be colored with any of the pigments usually employed for coloring of such coating compositions such as an organic pigment, carbon black, titanium dioxide, and aluminum flake.

The coating compositions may also have incorporated therein other additives such as wetting agents, conditioning agents, flow control agents, ultraviolet stabilizers, promoters for crosslinking and antioxidants.

The application of the coating composition to metal sheet and coil stock may be executed by a conventional method. That is, the composition may be applied by roller coating, by spraying with compressed air or with a petroleum solvent of low boiling point or by electrostatic spraying.

Solvent is evaporated from the metal substrate and the substrate is passed through an oven maintained at ambient temperature in the range of about 310° to 370° C. providing a dwell time in the range of about 15 to about 180 secs and allowing the coated metal substrate to reach a peak temperature in the range of about 200° to 240° C.

Practical and presently preferred embodiments of the present invention are shown for illustration in the following Examples wherein parts and percentages are by weight unless otherwise indicated.

TEST METHODS

Pencil hardness was measured according to ASTM D3363-74. Results are given on the scale 6B, 5B, 4B, 2B, B, HB, F, H, 2H to 9H going from softest to hardest.

T-bend flexibility was measured according to National Coil Coaters Association, standard T-bend test method, Technical Bulletin II-19. Evaluations are as follows: NCNPO = No Crack, No Pick-Off; VSCVSPO = Very Slight Crack, Very Slight Pick-Off; SCSPO = Slight Crack, Slight Pick-Off and CPO = Crack, Pick-Off.

Humidity resistance testing was carried out according to ASTM D-2247-68 using a Cleveland condensing humidity cabinet.

Gloss was measured according to ASTM-D573. Results are given in (%).

Reverse impact cross hatch testing was conducted at 120 in/lb impact force, using a 4 pound bullet. Scotch R 610 tape (3M) was used for adhesion testing. Results are expressed on a scale of 1 (worst) to 10 (best).

Chemical Resistance and stain testing was conducted as noted in the following examples.

EXAMPLE 1

Four epoxy-acrylic coating compositions were formulated according to the compositions given in Table 1.

TABLE 1

|  | 1A | 1B | 1C | 1D |
|---|---|---|---|---|
| Epoxy Resin$_1$ | 37.58 | 37.58 | 37.58 | 37.58 |
| Acrylic Resin$_2$ | 6.56 | 6.56 | 6.56 | 6.56 |
| Etherified Phenolic Resin$_3$ | 29.41 | 29.41 | — | — |
| Etherified Phenolic Resin$_4$ | — | — | 29.41 | 29.41 |
| SAA$_5$ | — | 3.68 | — | 3.68 |
| Catalyst$_6$ | 0.32 | 0.32 | 0.32 | 0.32 |
| 2-Butoxyethanol | 6.56 | 6.56 | 6.56 | 6.56 |
| 1-Butanol | 8.95 | 8.95 | 8.95 | 8.95 |
| Phenol | 2.44 | 2.44 | 2.44 | 2.44 |
| Isopropanol | 2.82 | 2.82 | 2.82 | 2.82 |
| Water | 5.36 | 5.36 | 5.36 | 5.36 |

TABLE 1-continued

|  | 1A | 1B | 1C | 1D |
|---|---|---|---|---|
|  | 100.00 | 103.68 | 100.00 | 103.68 |

$_1$Epon ® 1001F (Shell Chemical Company); a bisphenol A epichlorohydrin epoxy resin of equivalent weight of about 535 daltons
$_2$Acryloid ® AT-81, (Rohm & Haas Co.); a thermoset-table hydroxy functional acrylic resin
$_3$Santolink ® EP 560 (Monsanto Chemical Company); a butylated phenol-formaldehyde resin prepared by the process set forth at page 6, in which the phenol:formaldehyde ratio is 1:1.5, the degree of polymerization is 2.2 and the number of butoxy groups per phenolic ring is .25.
$_4$Methylon ® Resin 75108 (General Electric Company); allyl ether of dimethylol phenol.
$_5$RJ-101 ® styrene allyl alcohol copolymer (Monsanto Chemical Company); molecular weight 1150 daltons, hydroxy content 7.7 wt. percent.
$_6$NaCure 155 (King Industries, Inc.) a 55% solution of dinonylnaphthalene disulfonic acid in isobutyl alcohol.

Each of compositions was coated on can sheet stock and baked for 3 minutes at 220° C. to provide a coating layer having a 12.5 micron dry film thickness. The coated stock was subjected to pencil hardness, reverse impact cross hatch, steam blush and acid stain and alkaline stain testing. The results of the testing are set forth in Table 2. The data demonstrate the superior steam blush resistance of coatings containing the etherified phenol-formaldehyde resin used in the present invention compared with commercially available etherified phenol-formaldehyde resin sold under the trademark Methylon. The data also show the enhancement of properties obtained by introducing styrene allyl alcohol copolymer into the composition containing the etherified phenolformaldehyde resin of the present invention. In contrast no enhancement was observed with the "Methylon" composition.

TABLE 2

| FORMULA | Pencil Hardness | RI X-hatch | Steam Blush$_1$ | HCl (50%) Stain$_2$ | NaOH (10%) Stain$_3$ |
|---|---|---|---|---|---|
| 1A | H | 7 | 10 | 10 | 10 |
| 1B | 3H | 10 | 10 | 10 | 10 |
| 1C | 2H | 7 | 8 | 10 | 10 |
| 1D | 2H | 6 | 5 | 10 | 10 |

$_1$90 minutes exposure; 10 = pass, no defects.
$_2$2 hour exposure
$_3$2 hour exposure

EXAMPLE 2

A resin premix was formulated according to the composition given in Table 3.

TABLE 3

| Premixed Resin | |
|---|---|
| Etherified Phenolic Resin | 53.42 |
| SAA | 18.01 |
| 1-Butanol | 24.13 |
| Phenol | 4.44 |

Epoxy coatings were formulated according to the compositions given in Table 4. Compositions 2C and 2F include the resin premix of Table 3.

TABLE 4

| FORMULA | 2A | 2B | 2C | 2D | 2E | 2F |
|---|---|---|---|---|---|---|
| Premix Resin$_1$ | 0 | 0 | 37.93 | 0 | 0 | 37.93 |
| Epoxy Resin$_2$ | 34.17 | 34.17 | 34.17 | 0 | 0 | 0 |
| Epoxy | 0 | 0 | 0 | 34.17 | 34.17 | 34.17 |

TABLE 4-continued

| FORMULA | 2A | 2B | 2C | 2D | 2E | 2F |
|---|---|---|---|---|---|---|
| Resin₃ Etherified Phenolic Resin₄ | 22.78 | 22.78 | 0 | 22.78 | 22.78 | 0 |
| SAA | 0 | 15.15 | 0 | 0 | 15.15 | 0 |
| 2-Butoxy-ethanol | 34.17 | 34.17 | 34.17 | 34.17 | 34.17 | 34.17 |
| 1-Butanol | 6.99 | 6.99 | 6.99 | 6.99 | 6.99 | 6.99 |
| Phenol | 1.89 | 1.89 | 1.89 | 1.89 | 1.89 | 1.89 |
|  | 100 | 115.15 | 115.15 | 100 | 115.15 | 115.15 |

₁Premixed Resin from Table 3
₂Epon 1001F (Shell Chemical Company)
₃Epon 1007F (Shell Chemical Company); a bisphenol A epichlorohydrin epoxy resin of equivalent weight about 2000 daltons.
₄Santolink EP560 (Monsanto Chemical Company)

Each of coating compositions 2A and 2F was coated on cold rolled steel (bonderite ® 901) and baked for 15 minutes at 230° C to form a coating layer having a 25 micron dry film thickness.

The coated samples were subjected to reverse impact cross hatch, color difference, and chemical resistance testing. The results of the testing are set forth in Table 5. The data demonstrate the enhancement in reverse impact cross-hatch adhesion and resistance to chemical attack achieved with the introduction of styrene allyl alcohol copolymer, (examples 2B, C, E and F) and also enhancement in cross-hatch adhesion by use of epoxy resin of high equivalent weight.

TABLE 5

| FOR-MULA | RI Δb₁ | NaOH X-Hatch | Boil₂ | Chemical Resistance₃ H₂SO₄ | MEK | DMEA |
|---|---|---|---|---|---|---|
| 2A | 0 | 2 | pass | A, NC | SA, NC | NA, CC |
| 2B | 1.27 | 3 | pass | NA, NC | NA, NC | NA, CC |
| 2C | 0.97 | 3 | pass | NA, NC | NA, NC | NA, CC |
| 2D | 0 | 9 | pass | A, NC | NA, NC | NA, NC |
| 2E | 0.45 | 10 | pass | NA, NC | NA, NC | NA, NC |
| 2F | 0.67 | 10 | pass | NA, NC | NA, NC | NA, NC |

₁Color difference as read versus control on Bykometer (BYK-Chemie Co). formulas 2B and 2C were compared to formula 2A, formula 2E and 2F were compared to formula 2D.
₂30 minute immersion in boiling 10% NaOH
₃2 hour spot test under watch glass for each chemical. NA = no attack. SA = slight attack. A = attack; NC = no color change. CC = color change.

EXAMPLE 3

Coatings were formulated with the etherified phenol-formaldehyde resin (5 parts by weight) and the styrene allyl alcohol copolymer (5 parts by weight) used in Example 2. The coatings were applied to cold rolled steel panels (Bonderite 901) to provide a dry film thickness of 25 micron. Catalyzed cure with 0.2 part by weight potoluenesulfonic acid was carried out by baking at 150° C. for 30 minutes. The pencil hardness rating of the coatings was H, the gloss rating was 91, and the MEK solvent resistance rating was 100+. However the coatings failed the 2T-bend test and showed total lack of adhesion in the reverse impact cross-hatch adhesion test.

EXAMPLE 4

Coatings were formulated with the etherified phenol-formaldehyde resin of Example 2 (5 parts by weight), a hydroxy functional acrylic resin of Rohm and Haas Co., AT-400 (5 parts by weight) and 0.2 parts by weight of p-toluenesulfonic acid. The coating compositions were applied to cold rolled steel panels (Bonderite 901) to provide a dry film thickness of 25 micron. After a 30 minute bake at 150° C., the coatings possessed a 2H hardness rating, 98 gloss rating and MEK solvent resistance of 100+. They failed the 2T bend test and showed total lack of adhesion in the reverse impact cross-hatch adhesion test.

EXAMPLE 5

Polyester/melamine coatings were formulated according to the compositions given in Table 6.

TABLE 6

|  | 5A | 5B | 5C | 5D | 5F |
|---|---|---|---|---|---|
| Polyester Resin₁ | 27.35 | 27.35 | 27.35 | 27.35 | 27.35 |
| Melamine Resin₂ | 6.84 | 6.84 | 6.84 | 6.84 | 6.84 |
| EP 560₃ | 0 | 1.71 | 1.71 | 1.71 | 1.71 |
| SAA | 0 | 0 | 1.71 | 3.42 | 6.84 |
| TiO2 | 34.04 | 34.04 | 34.04 | 34.04 | 34.04 |
| Catalyst₄ | 0.29 | 0.29 | 0.29 | 0.29 | 0.29 |
| 2-Butoxy-ethanol | 15.08 | 15.08 | 15.08 | 15.08 | 15.08 |
| Aromatic Solvent | 15.08 | 15.08 | 15.08 | 15.08 | 15.08 |
| Isophorone | 1.32 | 1.32 | 1.32 | 1.32 | 1.32 |
| 1-Butanol | 0 | 0.51 | 0.51 | 0.51 | 0.51 |
| Phenol | 0 | 0.14 | 0.14 | 0.14 | 0.14 |
| Total | 100 | 102.36 | 04.07 | 105.78 | 109.2 |

₁Cyplex ® 1531 (American Cyanamid Company); a hydroxy functional polyester of equivalent weight 1400
₂Resimene ® 745 (Monsanto Chemical Company); a commercially available hexamethoxy-methylmelamine.
₃Santolink EP560 (Monsanto Chemical Company)
₄Para-Toluenesulfonic Acid Each of coating formulations 4A to 4C was applied to cold rolled steel (Bonderite 901, Parker Am-Chem) and baked for 30 seconds to achieve a peak metal temperature of 215° C. to provide a coating layer having a dry film thickness of 23 micron. The coated samples were subjected to pencil hardness, reverse impack cross hatch, and T bend testing. The results of the testing are given in Table 7 showing the enhancement in hardness, cross-hatch adhesion and T-bend resistance in association with the presence of styrene allyl alcohol copolymer.

TABLE 7

| FORMULA | Pencil Hardness | RI X-Hatch | 1T Bend | 2T Bend |
|---|---|---|---|---|
| 5A | F-H | 5 | CPO | SCNPO |
| 5B | F-H | 6 | CPO | SCNPO |
| 5C | 2H | 9 | NCNPO | NCNPO |
| 5D | 2H-3H | 8 | SCSPO | NCNPO |
| 5E | 3H | 7 | SCPO | SCNPO |

EXAMPLE 6

Polyester/melamine coatings were formulated according to the compositions given in Table 8.

TABLE 8

|  | 6A | 6B | 6C | 6D | 6E | 6F | 6G |
|---|---|---|---|---|---|---|---|
| Polyester₁ | 26.04 | 26.04 | 26.04 | 26.04 | 26.04 | 36.04 | 26.04 |
| Melamine Resin₂ | 11.16 | 11.16 | 11.16 | 11.16 | 11.16 | 11.16 | 11.16 |
| EP 560₃ | — | — | 0.37 | 0.37 | 0.37 | 0.19 | 0.19 |

TABLE 8-continued

| | | | | | | | |
|---|---|---|---|---|---|---|---|
| SAA | — | 3.77 | — | 3.77 | 1.88 | 1.88 | 3.77 |
| TiO2 | 32.44 | 32.44 | 32.44 | 32.44 | 32.44 | 32.44 | 32.44 |
| Catalyst4 | 0.27 | 0.27 | 0.27 | 0.27 | 0.27 | 0.27 | 0.27 |
| 2-Butoxy-ethanol | 14.41 | 14.41 | 14.41 | 14.41 | 14.41 | 14.41 | 14.41 |
| Aromatic Solvent | 14.41 | 14.41 | 14.41 | 14.41 | 14.41 | 14.41 | 14.41 |
| Isophorone | 1.27 | 1.27 | 1.27 | 1.27 | 1.27 | 1.27 | 1.27 |
| 1-Butanol | .81 | 0.81 | 2.55 | 2.55 | 1.62 | 1.60 | 2.53 |
| Phenol | 0.00 | 0.00 | 0.03 | 0.03 | 0.03 | 0.02 | 0.02 |
| Total weight | 101.81 | 104.58 | 102.95 | 106.72 | 106.50 | 103.90 | 103.68 |

| | 6H | 6I | 6J | 6K | 6L |
|---|---|---|---|---|---|
| Polyester1 | 26.04 | 26.04 | 26.04 | 26.04 | 26.04 |
| Melamine Resin2 | 11.16 | 11.16 | 11.16 | 11.16 | 11.16 |
| Etherified Phenolic Resin3 | 0.37 | 0.19 | 0.19 | 0.37 | 0.19 |
| SAA | 7.53 | 7.53 | 1.88 | 7.53 | 7.53 |
| TiO2 | 32.44 | 32.44 | 32.44 | 32.44 | 32.44 |
| Catalyst4 | 0.27 | 0.27 | 0.27 | 0.27 | 0.27 |
| 2-Butoxy-ethanol | 14.41 | 14.41 | 14.41 | 14.41 | 14.41 |
| Aromatic Solvent | 14.41 | 14.41 | 14.41 | 14.41 | 14.41 |
| Isophorone | 1.27 | 1.27 | 1.27 | 1.27 | 1.27 |
| 1-Butanol | 3.24 | 3.22 | 1.60 | 3.24 | 3.22 |
| Phenol | 0.03 | 0.02 | 0.02 | 0.03 | 0.02 |
| Total weight | 111.17 | 110.96 | 103.66 | 111.14 | 110.93 |

1REX-0304 (Guardsman Chemicals Inc.), a hydroxy functional polyester of hydroxy equivalent weight 620 daltons
2Resimene 745 (Monsanto Chemical Company)
3Santolink EP 560 (Monsanto Chemical Company)
4Para-Toluenesulfonic acid Each of coating compositions 6A to 6L was applied to cold rolled steel (Boderite ®901, Parker Am-Chem) and baked for 20 seconds to achieve a peak metal temperature of 215° C. to provide a coating layer having a dry film thickness of 20 micron. The coated samples were subjected to color difference, T bend, reverse impact cross hatch, pencil hardness, humidity and salt spray testing. The results of the testing are given in Table 9 showing that a balance of flexibility, adhesion, and humidity and salt spray resistance is obtained with moderate amounts of SAA and etherifield phenol-formaldehyde resin (Example 6D).

TABLE 9

| FORMULA | Δb1 | 0T Bend | 1T Bend | 2T Bend | RI X-Hatch | Pencil Hardness | 60° C. Humidity2 | 1000 hours Salt Spray3 |
|---|---|---|---|---|---|---|---|---|
| 6A | 0 | NCNPO | — | — | 8 | H-2H | 8 L | 3 |
| 6B | — | SCPO | VSCNPO | NCNPO | 8 | — | 8-9 L | 3-4 |
| 6C | — | SCNPO | NCNPO | — | 9 | — | 10 | 4-5 |
| 6D | 1.92 | VSCNPO | NCNPO | — | 8-9 | 3H | 10 | 5 |
| 6E | 2.17 | NCNPO | — | — | 9-10 | 2H | 8 L | 3-4 |
| 6F | 1.87 | NCNPO | — | — | 8-9 | 2H | 8 L | 3-4 |
| 6G | 2.07 | VSCVSPO | NCNPO | — | 7-8 | 3H | 8 L | 4-5 |
| 6H | 2.51 | CPO | SCSPO | — | 6 | 3H | 10 | 4 |
| 6I | 1.38 | CPO | SCPO | NCNPO | 5 | 3H | 10 | 4-5 |
| 6J | 1.97 | NCNPO | — | — | 9-10 | 2H-3H | 8 M | 3-4 |
| 6K | 2.76 | CPO | SCPO | NCNPO | 5 | 3H | 10 | 3-4 |
| 6L | 1.86 | CPO | CPO | NCNPO | 4 | 3H | 10 | 4-5 |

1Color difference versus 6A as control
2Condensing humidity at 60° C. for 1000 hours. Results are scored from 1 (worst) to 10 (best); L = large blister; M = moderate blister.
35% salt spray for 1000 hours. Results are scored from 1 (worst) to 10 (best).

EXAMPLE 7

Polyester/melamine coatings were formulated according to the compositions given in Table 10.

TABLE 10

| | 7A | 7B | 7C | 7D | 7E | 7F |
|---|---|---|---|---|---|---|
| Polyester Resin1 | 23.77 | 23.77 | 23.77 | 23.33 | 23.77 | 23.77 |
| Melamine Resin2 | 10.18 | 5.09 | 5.09 | 5.09 | 5.09 | 5.09 |
| Epoxy Resin3 | 0 | 2.55 | 2.55 | 0 | 2.55 | 0 |
| SAA | 0 | 1.28 | 1.28 | 0 | 1.28 | 0 |
| Etherified Phenolic Resin4 | 0 | 5.09 | 0 | 0 | 5.09 | 5.09 |
| Etherified Phenolic Resin5 | 0 | 0 | 5.09 | 5.09 | 0 | 5.09 |
| TiO2 | 33.95 | 33.95 | 33.95 | 33.95 | 33.95 | 33.95 |
| Catalyst6 | 0.35 | 0.35 | 0.35 | 0.35 | 0.35 | 0.35 |
| Catalyst7 | 0 | 0 | 0 | 0 | 0 | 0 |
| 2-Butoxy-ethanol | 14.54 | 14.54 | 14.54 | 14.54 | 14.54 | 14.54 |

TABLE 10-continued

| | 7A | 7B | 7C | 7D | 7E | 7F |
|---|---|---|---|---|---|---|
| Aromatic Solvent | 14.54 | 14.54 | 14.54 | 14.54 | 14.54 | 14.54 |
| Isophorone | 1.63 | 1.63 | 1.63 | 1.63 | 1.63 | 1.63 |
| 1-Butanol | 1.04 | 2.60 | 2.62 | 2.62 | 2.6 | 2.60 |
| Phenol | 0 | 0.42 | 0.43 | 0.43 | 0.42 | 0.42 |
| Total Weight | 100 | 105.80 | 105.84 | 102.01 | 105.81 | 101.98 |

$_1$Chempol 11-3820 (Freeman Chemical Corporation); an oil free hydroxy functional polyester of equivalent weight 320 daltons.
$_2$Resimene 745 (Monsanto Chemical Company)
$_3$EPON 1001F (Shell Chemical Company)
$_4$Santolink EP 560 (Monsanto Chemical Company)
$_5$UCAR ® Phenolic Resin BKS 7570 (Union Carbide Corporation); a low molecular weight etherified phenolic resin.
$_6$para-Toluenesulfonic acid
$_7$Toluenesulfonic acid Each of coating compositions 7A to 7F was applied to a cold rolled steel substrate (Bonderite 901, Parker Am-Chem) and baked for 30 seconds to achieve a peak metal temperature of 215° C. to provide a coating layer having a dry film thickness of 23 micron. The coated substrates were subjected to solvent rub, gloss, pencil hardness, reverse impact cross hatch and T bend testing. The results of the testing are given in Table 11, demonstrating an improvement in cross-hatch adhesion and flexibility with the introduction of SAA.

TABLE 11

| FORMULA | MEK D-RUBS$_1$ | Gloss$_2$ | pencil Hardness | RI X-Hatch | 1T Bend | 2T Bend | 3T Bend |
|---|---|---|---|---|---|---|---|
| 7A | 100+ | 85% | 5H | 0 | CPO | CPO | SCPO |
| 7B | 100+ | 84% | 5H | 4 | SCSPO | SCSPO | SCSPO |
| 7C | 100+ | 84% | 5H | 3 | CPO | SCPO | SCPO |
| 7D | 100+ | 83% | 5H | 3 | CPO | SCPO | SCPO |
| 7E | 100+ | 81% | 5H | 3 | SCSPO | SCSPO | SCNPO |
| 7F | 100+ | 74% | 5H | 2 | CPO | SCPO | SCPO |

$_1$double rubs with MEK soaked cloth
$_2$expressed as 90° light reflected in 60° angle measured on Bykometer Glossmeter.

EXAMPLE 8

Polyester/melamine coatings were formulated according to the compositions given in Table 12.

TABLE 12

| | 8A | 8B |
|---|---|---|
| Polyester Resin$_1$ | 27.28 | 27.28 |
| Melamine Resin$_2$ | 6.81 | 6.81 |
| Epoxy Resin$_3$ | 0 | 3.41 |
| SAA | 0 | 1.7 |
| Etherified Phenolic Resin$_4$ | 0 | 0.85 |
| TiO | 34.32 | 34.32 |
| Catalyst$_5$ | .33 | .33 |
| 2-Butoxyethanol | 14.96 | 14.96 |
| Aromatic Solvent | 14.96 | 14.96 |
| Isophorone | 1.67 | 1.67 |
| 1-Butanol | 0 | 0.26 |
| Phenol | 0 | 0.07 |
| Total | 100.33 | 106.62 |

$_1$Chempol 11-3820 (Freeman Chemical Corporation)
$_2$Resimene 745 (Monsanto Chemical Company)
$_3$Epon 1001F (Shell Chemical Company)
$_4$Santolink EP560 (Monsanto Chemical Company)
$_5$NaCure 155 (King Industries, Inc.)

An epoxy/phenolic primer was applied to cold rolled steel sheet (Bonderite 901, Parker Am-Chem Co.) for 30 seconds to achieve a peak metal temperature of 230° C. and provide a coating layer having a dry film thickness of 5 micron. Each of coating formulations 8A and 8B was applied to the primed cold rolled steel and baked for 30 seconds to achieve a peak metal temperature of 230° C. and provide a topcoat layer having a dry film thickness of 20 micron. The top coated samples were subjected to pencil hardness and T bend testing. The results given in Table 13 suggest that an eposy/phenolic primer reduces the effect of property enhancement obtained with compositions containing SAA and etherified phenol-formaldehyde resin.

TABLE 13

| FORMULA | Pencil Hardness | 1T Bend |
|---|---|---|
| 8A | 5H | VSCNPO |
| 8B | 5H | VSCVSPO |

In general, the coating compositions of the present invention exhibit improved gloss, hardness, chemical resistance, adhesion, flexibility and resistance to yellowing. The physical properties of the cured coating composition of the present invention are improved relative to those of analogous coating compositions in which the styrene allyl alcohol and the etherified phenolic resin of the present composition are omitted, to analogous compositions in which the styrene allyl alcohol is included but the etherified phenolic resin is omitted and to analogous compositions in which the etherified phenolic resin is included but the styrene allyl alcohol is omitted. While preferred embodiments have been shown and described, various modifications and substitutions may be made thereto without departing from the spirit and scope of the invention. Accordingly, it is to be understood that the present invention has been described by way of illustration and not limitation.

What is claimed is:
1. A crosslinker composition comprising:
   A. from about 9 to about 99 parts by weight of a high ortho etherified reaction product of a phenolic compound and formaldehyde, said reaction product being a resin characterized by:
      (i) having a reacted formaldehyde to phenolic compound mole ratio of 1.0 to 2.0, said formaldehyde reacting with said phenolic compound, forming methylol groups taking a final orientation of about 90% to 100% in the ortho position,
      (ii) having said phenolic compound selected from the group consisting of phenol, meta-substituted phenols and mixtures of phenol and substituted phenols,
      (iii) having condensed linkages between the phenolic compound and the formaldehyde, wherein 25% to 90% of said linkages are benzyl ether linkages having a final orientation essentially in the ortho position and 10 to 75% are methylene linkages taking a final orientation of about 70% to 90% in the ortho position and about 10 to 30% in the para position.

(iv) having an average degree of polymerization in the range of about 1.45 to less than 4.0, and (v) having said methylol groups partially etherified with a monohydric alcohol; and B. from about 1 to about 91 parts by weight of a styrene (meth)-allyl alcohol copolymer of average molecular weight in the range of about 800 to about 2500 daltons and a hydroxy content between about 4 and about 10 weight percent.

2. The composition of claim 1 wherein the phenolic compound is phenol.

3. The composition of claim 2 wherein the resin is prepared by reacting the phenol and the formaldehyde in an aqueous reaction mixture under reflux at about 80 C. to 100 C., in the presence of a divalent electropositive metal ion while maintaining a pH in the range between about 4 and 7 controlled by adding sufficient amounts of an organic acid and thereafter etherifying the product with a monohydric alcohol at a temperature of 65 C. to 100 C., and dehydrating the resulting aqueous solution to a water content of less than about 1 weight percent and an alcohol content of less than about 5 weight percent.

4. The composition of claim 2 wherein the monohydric alcohol is a $C_1$ to $C_{12}$ alcohol 5. The composition of claim 4 wherein the amount of monohydric alcohol ether group per phenolic group is in the range of 0.2 to 0.4.

6. The composition of claim 5 wherein the amount of resin is in the range of about 55 to about 85 parts by weight and wherein the amount of styrene allyl alcohol copolymer is in the range of about 15 to about 45 parts by weight.

* * * * *